(No Model.)
J. W. D. FIFIELD.
Machine for Cutting the Vamps and Uppers of Boots and Shoes.
No. 241,532. Patented May 17, 1881.
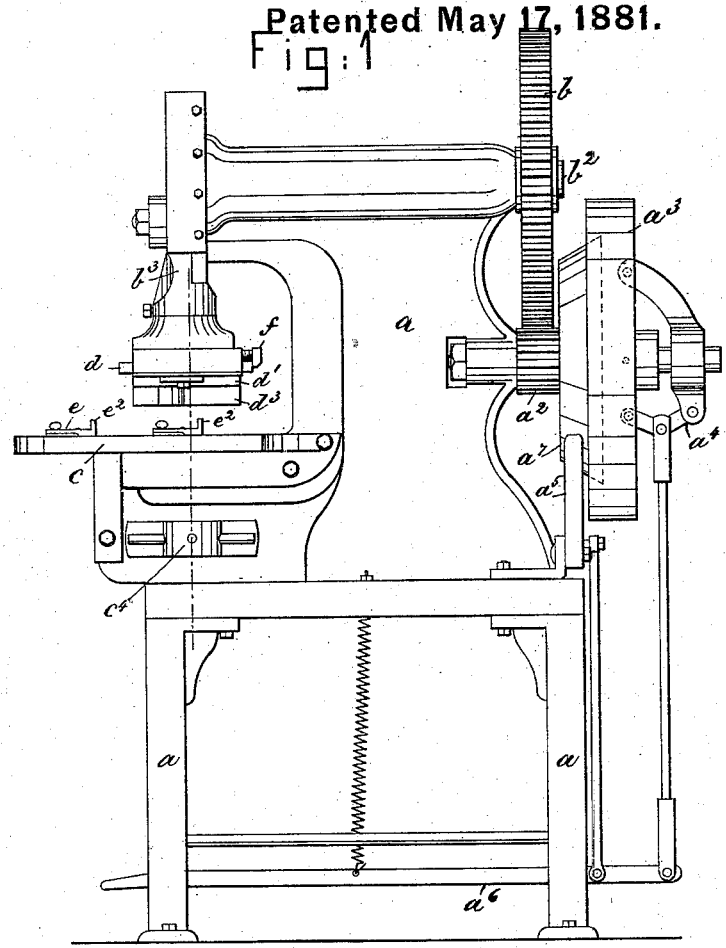
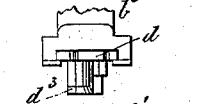
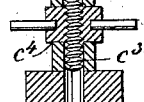
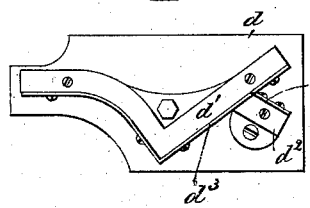
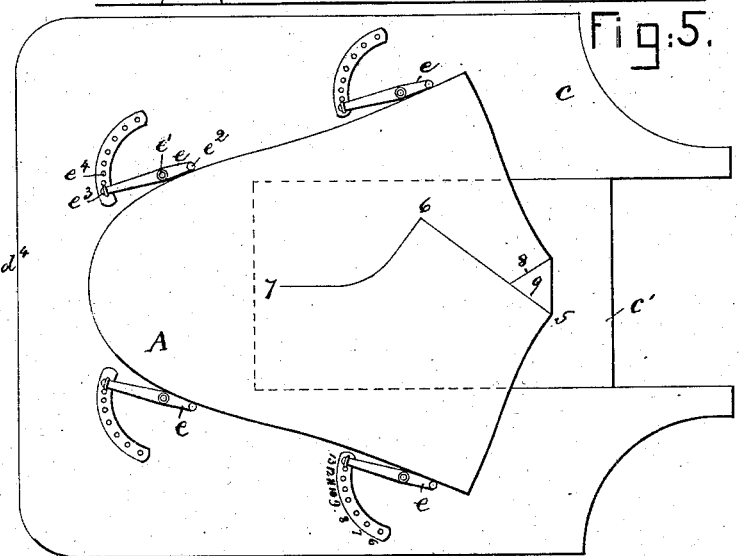
Witnesses
Arthur Reynolds
Bernice L. Hayes
Inventor.
John W. D. Fifield,
by Crosby Gregory Attys.

UNITED STATES PATENT OFFICE.

JOHN W. D. FIFIELD, OF NORTH BROOKFIELD, MASSACHUSETTS.

MACHINE FOR CUTTING THE VAMPS AND UPPERS OF BOOTS AND SHOES.

SPECIFICATION forming part of Letters Patent No. 241,532, dated May 17, 1881.

Application filed March 21, 1881. (No model.)

*To all whom it may concern:*

Be it known that I, JOHN W. D. FIFIELD, of North Brookfield, county of Worcester, and State of Massachusetts, have invented an Improvement in Machines for Cutting the Vamps and Uppers of Boots and Shoes, of which the following description, in connection with the accompanying drawings, forms a specification.

This invention has for its object the production of a machine for slitting the uppers of shoes; and it consists, essentially, in the combination, with a cutting-bed and vamp-cutter, of gages to position the edges of the said vamp or upper. I prefer to have, and have therefore shown, these gages as made adjustable to accommodate vamps or uppers of different sizes, and in connection with the gages I have placed scales or marks to indicate the sizes of the shoes.

The cutter employed by me is bent or shaped to correspond with the irregular or inclined and curved slit to be made by it, and with the main cutter-blade I have combined an auxiliary or notching blade, which, co-operating with the main cutter, removes a small piece of the leather from the upper edge of the vamp.

Figure 1 represents, in side elevation, a sufficient portion of a vamp or upper slitting machine to illustrate my invention; Fig. 2, a detail, showing the head of the follower and the cutter-carrying plate fitted therein; Fig. 3, a sectional detail of the cutting-bed and devices for adjusting it, the section being in the dotted line, Fig. 1; Fig. 4, an enlarged under-side view of the cutter-carrying plate and its attached main and auxiliary cutters; and Fig. 5 is an enlarged top view of the cutting-bed with a vamp or upper thereon between the gages, the vamp being shown slitted, as it will be, by the cutters.

The frame-work $a$ will be of suitable shape and size to properly support the working parts. The pinion $a^2$, connected with a short shaft, will be driven in any usual manner, and through the gear $b$ on the main shaft $b^2$, provided at its front end with a cam, crank, or crank-pin, will reciprocate the follower $b^3$ in any usual manner.

The devices so far referred to by letter, and the belt-pulley $a^3$, the clutching devices $a^4$, brake $a^5$, treadle $a^6$, its connecting-links, and the pulley $a^7$, are all as common to sole-cutting machines now in use, and are not of my invention. The said devices operate to rotate the shaft $b^2$ once, and then arrest the rotation of the said shaft until the clutch is again engaged.

The table or platform $c$ has fitted centrally into it the cutting-block $c'$, preferably of wood, the said block being supported on a cross-head, $c^2$, the screw-threaded stem $c^3$ of which is provided with a nut, by which the said cutting-bed may be raised or lowered, as described, to compensate for wear or secure proper adjustment as to its position, as in Fig. 3.

The follower $b^3$, at its lower end, is grooved or rabbeted (see Fig. 2) to receive within it the cutter-carrying plate $d$, having blade-holding projections $d'$ $d^2$, upon which are secured the main cutter $d^3$ and the auxiliary cutter $d^4$. (See Fig. 4.)

The outline of the main cutter is such as to cut the inclined or curved slit 5 6 7 (see Fig. 5) in the vamp A of one form of plow-shoe, while the auxiliary cutter $d^4$ cuts the short slit 8, to intersect the slit 5 6 and remove or detach the small piece 9. (See Fig. 5.)

One or several vamps A in a pile may be cut at each descent of the cutters. I shall preferably cut six or more vamps at one operation, thus saving time, as heretofore it has been common to slit the vamps separately.

The gages $e$, four of which are shown, are made as levers, pivoted at $e'$, and having at their short ends upwardly-extended pins $e^2$, to receive against them the edges of the vamp or pile of vamps, as in Fig. 5, while the rear ends of the gages or their long arms are provided with pins $e^3$, to enter either one of the series of holes $e^4$, each hole of each series of holes corresponding with a size of vamp which the said gages will correctly position under the cutters.

One of the said scales is numbered from 6 to 13, the said numbers indicating corresponding sizes of shoes.

The backward position of the cutter-carrying slide $d$ is controlled by the adjusting device $f$, (see Fig. 1,) shown as a screw. The cutting-bed $c'$ need not necessarily be longer than the longest slit 5 6 7 to be cut.

I claim—

1. In a machine for slitting vamps or uppers, the bed $c$ and the cutting-bed $c'$, combined with the adjustable gages, to operate upon the edges of the pile of vamps, and with the cutter $d^3$, shaped as shown, to slit the vamp or upper centrally, substantially as described.

2. In a machine for cutting vamps or uppers, the bed $c$, adjustable cutting-bed $c'$, cutter $d^3$ to slit the vamp centrally, and adjusting device and cutter-carrier controlled by it, combined with the reciprocating follower to automatically reciprocate the said cutter, substantially as and for the purpose described.

3. The follower, cutter-carrier, and cutters $d^3$ $d^4$ connected therewith, to slit the central part of the vamp, as shown and described, combined with the bed $c'$ and gages for the uppers, substantially as described.

In testimony whereof I have signed my name to this specification in the presence of two subscribing witnesses.

JOHN W. D. FIFIELD.

Witnesses:
J. H. LOMBARD,
J. B. MEAXWELL.